(12) United States Patent
Das et al.

(10) Patent No.: US 9,020,502 B2
(45) Date of Patent: Apr. 28, 2015

(54) PROXIMITY INDICATION USING OUT-OF-BAND LINKS

(75) Inventors: Soumya Das, San Diego, CA (US);
Damanjit Singh, San Diego, CA (US);
Samir Salib Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 13/399,404

(22) Filed: Feb. 17, 2012

(65) Prior Publication Data

US 2013/0217385 A1    Aug. 22, 2013

(51) Int. Cl.
*H04W 64/00* (2009.01)
*H04W 48/16* (2009.01)
*H04W 84/04* (2009.01)

(52) U.S. Cl.
CPC .......... *H04W 48/16* (2013.01); *H04W 84/045* (2013.01)

(58) Field of Classification Search
CPC ... H04W 84/045; H04W 48/16; H04W 60/00; H04W 21/10
USPC ............. 455/422.1, 434, 435.1; 370/252, 311
See application file for complete search history.

(56) References Cited

U.S. PATENT DOCUMENTS

| 8,155,081 | B1 | 4/2012 | Mater et al. |
| 2007/0078974 | A1 | 4/2007 | Krishnan |
| 2009/0247170 | A1 | 10/2009 | Balasubramanian et al. |
| 2009/0296641 | A1 | 12/2009 | Bienas et al. |
| 2010/0008230 | A1 | 1/2010 | Khandekar et al. |
| 2010/0113038 | A1 | 5/2010 | Eskicioglu et al. |

(Continued)

FOREIGN PATENT DOCUMENTS

| EP | 2262316 A1 | 12/2010 |
| WO | 2009120902 A1 | 10/2009 |

OTHER PUBLICATIONS

"IEEE Standard for Information Technology Telecommunications and Information Exchange Between Systems Local and Metropolitan Area Networks Specific Requirements Part 11: Wireless Lan Medium Access Control (MAC) and Physical Layer (PHY) Specifications Amendment 1: Radio Resource Measurement of Wireles", IEEE Standard STD 802.11; [IEEE Standard], IEEE, Piscataway, NJ, USA, Jun. 12, 2008 , pp. c1-c222, XP017604122, ISBN: 978-0-7381-5420-6 chapter 5.2, 7.2.

(Continued)

*Primary Examiner* — Sam Bhattacharya
(74) *Attorney, Agent, or Firm* — Jeffrey D. Jacobs

(57) ABSTRACT

Management of user equipment (UE) proximity indications to femto access points is provided using out-of-band (OOB) signals. To obtain OOB identification information on the femto access point, the UE determines the OOB identification information when in proximity to cells neighboring the femto access point. This OOB information is stored in a search information database (SID) of the UE and related to in-band information on the femto access point. To later determine proximity to the femto access point, in response to detecting its presence within a fingerprint area around the femto access point, a search for the femto access point is triggered using the OOB radio resources and OOB identification information associated with the femto access point in the SID. When the UE detects the femto access point using the OOB radio resources, the UE transmits a proximity indication to its serving base station over the in-band radio link.

88 Claims, 6 Drawing Sheets

(56) References Cited

U.S. PATENT DOCUMENTS

| | | |
|---|---|---|
| 2010/0151858 A1 | 6/2010 | Brisebois et al. |
| 2010/0203891 A1 | 8/2010 | Nagaraja et al. |
| 2010/0285793 A1 | 11/2010 | Yoon et al. |
| 2010/0303051 A1 | 12/2010 | Umeuchi et al. |
| 2010/0323633 A1 | 12/2010 | Pani et al. |
| 2011/0170481 A1 | 7/2011 | Gomes et al. |
| 2011/0189998 A1 | 8/2011 | Joo et al. |
| 2011/0195715 A1 | 8/2011 | Wu |
| 2011/0263258 A1 | 10/2011 | Soliman et al. |
| 2012/0046025 A1 | 2/2012 | Das et al. |
| 2012/0202509 A1 | 8/2012 | Han et al. |
| 2013/0003654 A1 | 1/2013 | Iyer et al. |
| 2013/0225165 A1 | 8/2013 | Das et al. |

OTHER PUBLICATIONS

International Search Report and Written Opinion—PCT/US2013/026480—ISA/EPO—Jun. 18, 2013.

Partial International Search Report—PCT/US2013/026480—ISA/EPO—Apr. 22, 2013.

PROXIMITY INDICATION USING OUT-OF-BAND LINKS

BACKGROUND

1. Field

Aspects of the present disclosure relate generally to wireless communication systems, and more particularly, to proximity indication using out-of-band (OOB) links.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or NodeBs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Various aspects of the present disclosure are directed to detecting proximity to a femto access point or home NodeB (HNB) that includes determining the cell or cells of a current location of a UE. The determined cell or cells are compared to a first group of cells that include at least one neighbor macro cell of the femto access point. As the first group of cells includes at least one neighboring macro cell to the UE's femto access point, the first group may be referred to as the first group of home cells. In response to the determined cell or cells being a part of the first group of home cells, the UE searches or scans for the femto access point using an out-of-band (OOB) radio link. The UE searches for OOB identity information associated with the femto access point. Once the UE detects OOB identification information, it maps that OOB identification information to previously stored identification information in a femto access point search information database (SID) to verify that the OOB identification information is associated with the femto access point. In response to verifying the OOB identification information is associated with the femto access point, the UE transmits a femto access point proximity indication to the macro network via a serving base station using an in-band radio link.

Various additional aspects of the present disclosure are directed to transmitting a proximity indication to the macro network when it is determined that the UE is proximate to the femto access point. This determination is made by the UE either: (1) when a response is received from the femto access point over an OOB radio link; (2) when OOB identification information for the femto access point is detected by the UE over the OOB radio link; or (3) from determining that the UE is within one or more of the neighboring macro cells to the femto access point. This determination that the UE is within the one or more neighbor macro cells includes comparing the cell or cells of the UE's current location to the one or more macro cells known to be neighboring the femto access point.

Various further additional aspects of the present disclosure are directed to managing information for a femto access point at a UE. In such aspects, the UE detects a femto access point and stores neighbor cell information for the detected femto access point into a proximity database within the UE. The UE also stores in-band (WWAN) femto access point identification information in a femto access point search information database (SID). The UE further determines OOB identification information related to the femto access point and stores that OOB identification information in the femto access point SID with relational mapping data showing the connection between the in-band femto access point identities and femto access point OOB identities.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wide area or local area wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95, IS-856, and 1xEV-DO standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000®, 1xEV-DO, and UMB are described in documents from an organization called the "3rd Generation Partnership Project 2" (3GPP2). The techniques described herein may be used for the wireless networks and radio access technologies mentioned above, as well as other wireless networks and radio access technologies. While the various aspects and alternatives of the present disclosure may be applicable to numerous types of network technologies, such as LTE, UMTS, and the like, the aspects described herein are disclosed with respect to UMTS network technology. However, it will be understood that the various aspects of the present disclosure are not limited to application in UMTS systems.

Figure 1:
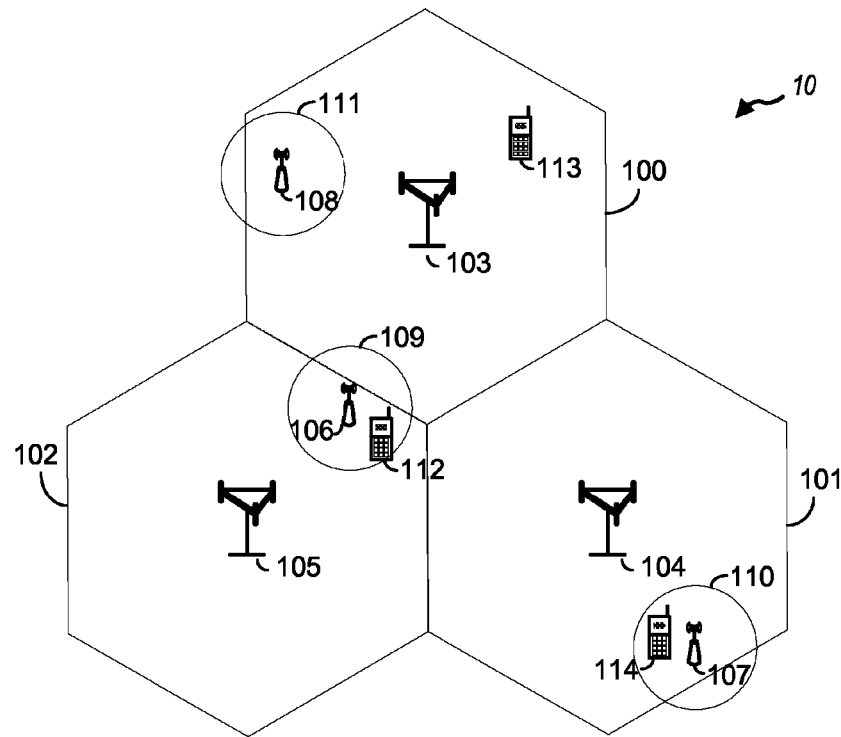
FIG. 1 is a block diagram conceptually illustrating an example of a mobile communication system.

FIG. 1 shows a wireless network 10 for communication. Wireless network 10 may be an UMTS network. The wireless network 10 includes a number of access points (APs) 103-108 and other network entities. An access point may be a station that communicates with the UEs and may also be referred to as a base station, a NodeB (NB), an access point, and the like. Each of access points 103-108 may provide communication coverage for a particular geographic area. In 3GPP, the term "cell" can refer to this particular geographic coverage area of an access point and/or an access point subsystem serving the coverage area, depending on the context in which the term is used. Access points 103-108 each provide communication coverage in cells 100-102 and 109-111, respectively.

An access point may provide communication coverage for a macro cell, a pico cell, a femto cell, and/or other types of cell. A macro cell, such as cells 100-102, generally covers a relatively large geographic area (e.g., several kilometers in radius) and may allow unrestricted access by UEs with service subscriptions with the network provider. A pico cell, such as cell 111, may generally cover a relatively smaller geographic area and may allow unrestricted access by UEs with service subscriptions with the network provider. A femto cell, such as cells 109-110, may also generally cover an even smaller area (e.g., a home, a room, or the like) and, in addition to unrestricted access, may also provide restricted access by UEs having an association with the femto cell (e.g., UEs in a closed subscriber group (CSG), UEs for users in the home, and the like). An access point for a macro cell may be referred to as a macro access point. An access point for a pico cell may be referred to as a pico access point or generally as a femto access point along with an access point for a femto cell. For purposes of this application, "femto access point" will be used to refer to access points that are not macro access points, such as femto access points, pico access points, home NodeBs (HNBs), and the like. In the example shown in FIG. 1, the access points 103-105 are macro access points for the macro cells 100-102, respectively. The access points 106-108 are a femto access points for the femto cells 109-110 and the pico cell 111. An access point may support one or multiple (e.g., two, three, four, and the like) cells.

The wireless network 10 may support synchronous or asynchronous operation. For synchronous operation, the access points may have aligned frame timing, and transmissions from different access points may be aligned in time. For asynchronous operation, the access points may have different frame timing, and transmissions from different access points may not be aligned in time. The techniques described herein may be used for either synchronous or asynchronous operations.

The UEs 112-114 are dispersed throughout the wireless network 10, and each UE may be stationary or mobile. A UE may also be referred to as a terminal, a mobile station, a mobile equipment, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro access points, femto access points, relays, and the like.

The wireless network 10 uses the diverse set of access points 103-108 (e.g., macro access points and femto access points) to improve the spectral efficiency of the system per unit area. Because the wireless network 10 uses such different access points for its spectral coverage, it may also be referred to as a heterogeneous network. The macro access points 103-105 are usually carefully planned and placed by the provider of the wireless network 10. The macro access points 103-105 generally transmit at high power levels (e.g., 5 W-40 W). The femto access point 108 defining the pico cell 111 generally transmits at substantially lower power levels (e.g., 100 mW-2 W), and may be deployed in a relatively unplanned manner to eliminate coverage holes in the coverage area provided by the macro access points 103-105 and improve capacity in the hot spots. The femto access points 109-110, which are typically deployed independently from the wireless network 10 may, nonetheless, be incorporated into the coverage area of the wireless network 10 either as a potential access point to the wireless network 10, if authorized by their administrator(s), or at least as an active and aware access point that may communicate with the other access points 103-105 and 108 of the wireless network 10. The femto access points 106-107 typically also transmit at substantially lower power levels (e.g., 100 mW-200 mW) than the macro access points 103-105.

Femto access points, such as femto access points 106-107 deployed in a UMTS High Speed Packet Access (HSPA) system or Release 99 of UMTS, may also be referred to as home NBs (HNBs). Femto access points deployed in LTE systems may be referred to as home evolved NodeBs (HeNBs) when deployed in a home access context. For purposes of this disclosure HeNBs and HNBs will be collectively referred to as HNBs or referred to generally as femto access points. Deployment of HNBs or femto access points offers to increase services and data rates for home environments while freeing bandwidth for the macro access points serving the area in which the HNB or femto access point is deployed. The femto access point functionality and interfaces may be basically the same as for regular macro access points. When femto access points are deployed into the wireless network, the network is able to control the femto access point's interactions with the network, such as to activate or deactivate the femto access point, verify the ID and geographic location, determine state, and the like.

It should further be noted that the various aspects of the present disclosure are equally applicable in UMTS, LTE, and the like wireless technologies. Accordingly, for purposes of this disclosure, macro evolved NodeBs (LTE) and macro NodeBs (UMTS) will be collectively referred to as macro access points. One of skill in the art would easily understand the structural and technical differences between various wireless communication technologies, such as UMTS and LTE, and further understand that the aspects disclosed herein are equally applicable to any such similar wireless technology.

Often, the femto access point will include multiple radios with which it may communicate. For communications with a UE that will be a part of the wireless communication network, the femto access point may communicate using an in-band communication link, such as a wireless wide area network (WWAN) link over a frequency which may or may not be the same frequency that a macro access point on the network will use for communications. A femto access point may also include short-range communications capabilities for out-of-band (OOB) signals and transmissions including OOB radios such as BLUETOOTH®, BLUETOOTH® Low Energy (LE), WIFI™ (standardized through IEEE 802.11), WIFI DIRECT™, ZIGBEE™, IEEE 802.15, and the like. Because modern UEs also generally include multiple radios in addition to WWAN radios for communication using the OOB protocols, a UE may also be able to establish communication with a femto access point using these OOB radios in addition to the UE's WWAN in-band communication capabilities.

In operation, some femto access points that include OOB capabilities may be referred to as femto OOBs or femto OOB access points, which could include a femto access point that also has an associated OOB radio component. Another implementation of a femto OOB could be an integrated femto OOB, such as an integrated femto WIFI™ (IFW) in which a WIFI™ radio is integrated into the same physical femto cell component. Another implementation of a femto OOB may be where the OOB access point is attached as a universal serial bus (USB) attachment or dongle to the femto access point or vice versa. In yet another embodiment of a femto OOB, the femto access points may be associated with an OOB access point in the sense that they belong to the same user and are usually in the same subnet. This can be treated as a virtual integrated femto OOB. The OOB radios for such femto OOBs may include BLUETOOTH®, BLUETOOTH® LE, WIFI™, WIFI DIRECT™, ZIGBEE™, IEEE 802.15, and the like.

Access to femto access points may be closed to all non-CSG members, open for access to any UE, or a hybrid cell, with both closed and open access opportunities. Before making a handover decision to handover a UE to an accessible target femto access point, a macro access point examines measurement information regarding the target femto access point and its access control mechanism. However, it would be impractical for a UE to take continuous measurements of every femto access point on its CSG whitelist and read the system information of those CSG cells that it encounters, especially when the femto access point is on a different frequency than the macro frequency as that would involve inter-frequency measurements.

In order to efficiently manage this inter-frequency measurement for inward/inbound handover from macro access points to femto access points, a proximity report has been defined in which a capable UE detects, by some means, that it is proximate to a femto access point on its approved CSG list and transmits a proximity indication to the macro network through its serving macro access point. A UE will send a proximity indication to the source access point in the uplink whenever it is entering or leaving the proximity of one or more cells with CSG identifiers (CGIs) that the UE has in its CSG whitelist. UEs typically maintain a list of approved or accessible CSG cells organized by the femto access point's identifier, referred to as its CSG identifier (CGI). The list is sometimes referred to as a CSG whitelist. Thus, a UE that is capable of determining proximity to a femto access point on its CSG whitelist may then inform the network of this proximity. The network will subsequently trigger measurement information requests and other preparations for handover. For example, the network may schedule compressed mode measurements for the UE to tune away to the other frequency and make measurements if the UE is in a connected state with the macro access point. Based on the UE measurements, the network decides whether to initiate handover of the UE from the macro access point to the femto access point.

Referring again to FIG. 1, femto access points 106-107 comprise femto access points or home NBs (HNBs) deployed within wireless network 10 creating femto cells 109 and 110, respectively. UEs 112-114 are also illustrated within wireless network 10. In an existing proximity detection method, a home area is defined by macro cells that are known neighbors of the target femto access point. For example, for purposes of the aspect illustrated in FIG. 1, femto access point 106 and femto cell 109 are a femto access point and home cell of UE 112. Therefore, according to the existing proximity determination schemes, the home area, also sometimes referred to as a fingerprint, may be defined as the combined area of macro cells 100-102. UE 112 saves identifying information of macro cells 100-102 in a proximity database for use in proximity detection of the femto access point, femto access point 106. Thus, in such existing proximity detection schemes, each time UE 112 moves into a location in which one of macro cells 100-102 becomes the strongest cell or is a member of its active set, UE 112 transmits a proximity indication, indicating proximity to the Femto access point 106, to its serving access point, such as macro access point 105. Additionally, the UE 112 will also store the femto access point-related identification information, including the radio access technology (RAT), frequency, cell ID, primary scrambling code (PSC), public land mobile network (PLMN) ID, and the like, in a femto access point search information database (SID).

In many implementations, a femto access point communicates on a different frequency than the frequency used for communication with the macro access point. Therefore, when proximity to the femto access point is detected, by whatever means, a UE tunes away from the macro frequency in order to perform the measurements. In order to facilitate this, the macro access point schedules the UE for compressed mode gaps, during which the UE tunes away from the macro frequency to perform measurements of the target femto access point. For example, when UE 112 detects cell 102 as the strongest cell in its active set, it makes the determination that it is in proximity to its HNB, femto access point 106. In the existing detection schemes, UE 112 would then transmit a proximity report to macro access point 105, as its serving cell, with a proximity indication. In response to receiving the proximity indication, macro access point 105 transmits a message to UE 112 requesting measurement information for femto access point 106. Included in this measurement request, is an assignment of a compressed mode gap for UE 112. UE 112 uses this compressed mode gap to tune away from macro access point 105 in order to detect and perform measurements on femto cell 109, as serviced by femto access point 106. While UE 112 is tuned away from macro access point 105 during the compressed mode gap, its connection with macro access point 105 is preserved.

The effect on the capacity of cell 102 is only one shortcoming of this fingerprint proximity detection method. Because the fingerprint home area includes cells 100-102, a UE, such as UE 113, may fall within the fingerprint, indicating proximity to its HNB, femto access point 106, even though it is a considerable distance from femto access point 106. When UE 113 receives the measurement request from macro access point 103, it may expend considerable power searching for femto cell 109 in one or multiple instances of compressed mode.

While this current method for determining proximity is reliable to trigger proximity indication, it is not very precise and, therefore, the UE sends proximity indications even when it is geographically not proximate to a femto access point. This result in macro network scheduling one or more compressed mode measurements of the femto access point, which are wasted, as the UE is not yet close enough to the femto access point to detect it, though, the UE may eventually detect the target femto access point. As this current method would cause the UE to tune away from its serving access point in order to perform the requested measurements when the UE is not yet close enough to the femto access point, capacity of the serving access point may be negatively impacted.

A method for detecting proximity is disclosed that uses the out-of-band (OOB) link capabilities (e.g., BLUETOOTH®, WIFI™, BLUETOOTH® LE, WIFI DIRECT™, ZIGBEE™, IEEE 802.15, and the like) of certain UEs and femto access points to detect proximity. When the UE discovers that it is in its fingerprint area, instead of immediately reporting the proximity indication for the corresponding femto access point, the UE triggers femto access point detection using the OOB link. Upon detecting the femto access point over the OOB link, the UE determines itself to be in proximity to its femto access point and transmits the proximity indication to its serving base station. Detection over the OOB link is a very precise and reliable mechanism for triggering a proximity indication. Once the proximity indication is sent to the macro network by the UE, the network configures the UE for compressed mode measurement. Therefore, one instance of compressed mode measurement is still required with this new method. However, as the UE's proximity to the femto access point may be determined more accurately, this method limits the number of occurrences of compressed mode as compressed modes measurements are scheduled by network when UE is actually close to the femto access point.

Because this method uses the OOB capabilities of the UE and femto access point, the femto access point SID will be updated to include the OOB identification information associated with the femto access point in addition to the femto access point-related identification information already used in the previous fingerprint-only method. Relational mapping information is created and store in the femto access point SID that identifies the relationship between the femto access point in-band information and femto access point OOB information. Therefore, when a UE desires to scan for a particular femto access point over an OOB link, it can look up the femto access point OOB information to use during the scan. Similarly, when a UE detects transmission of the femto access point OOB information or receives a response to the scan from a femto access point over an OOB link, the received femto access point OOB information from the femto access point will be associated with the femto access point in-band information using the corresponding mapping information from the femto access point SID.

Referring back to FIG. 1, UE 112, which is configured according to one aspect of the present disclosure, detects that cell 102 has become a member of its active set. The UE 112 determines from its proximity database that cell 102 is one of the home cells in the fingerprint associated with femto access point 106. As cell 102 is a member of UE 112's fingerprint home area, UE 112 determines that it may be in proximity to one of its femto access points, e.g., femto access point 106. However, in the aspect illustrated in FIG. 1, instead of transmitting a proximity indication to macro access point 105, the detected presence within the fingerprint area triggers UE 112 to perform a search for a femto access point using the OOB radio. The UE 112 refers to the femto access point SID to retrieve the femto access point OOB identification information and uses that information to scan the femto access point over the OOB link.

Figure 2:
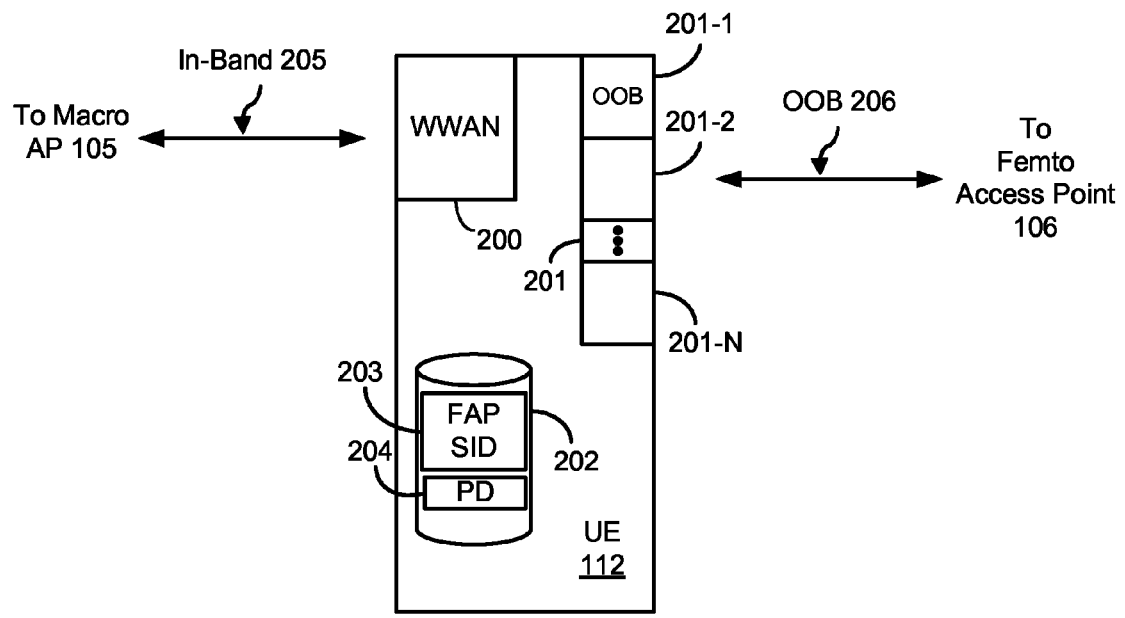
FIG. 2 is a block diagram illustrating a detail of UE configured according to one aspect of the present disclosure.

FIG. 2 is a block diagram illustrating a detail of UE 112 configured according to one aspect of the present disclosure. UE 112 includes a wireless wide area network (WWAN) radio component 200 and also OOB radio components 201. OOB radio components 201 may include multiple different radios, OOB radios 201-1-201-N, for various wireless technologies, such as BLUETOOTH®, BLUETOOTH® LE, WIFI DIRECT™, ZIGBEE™, IEEE 802.15, global positioning system (GPS), and the like. Each of the radio components includes receivers, transmitters, antennas, and the like, used for sending and receiving transmissions over the WWAN and OOB protocols. For example, UE 112 detects macro cell 102 as a member of its active set over WWAN radio component 200. UE 112 then searches proximity database (PD) 204. PD 204 contains the details of the fingerprint area around the femto access points associated with UE 112, including the fingerprint surrounding the femto access point 106. As cell 102 is within this fingerprint area, UE 112 begins scanning for femto access point 106 using OOB radio components 201. UE 112 continues transmitting and receiving data over in-band WWAN link 205 with macro access point 105, if it is in a connected state, while scanning for the femto access point 106 over the OOB link 206 from femto access point 106 using OOB radio components 201.

Femto access point 106 has capability for WIFI™ transmissions. UE 112 detects the WIFI™ signals of femto access point 106 and is able to identify femto access point 106 from the WIFI™ signals received over WIFI™ OOB radio 201-1. UE 112 uses the WIFI™ identification information of femto access point 106 and match it to the in-band/WWAN identification information of femto access point 106 stored in femto access point SID 203 in memory 202. UE 112 uses relational mapping data in the femto access point SID 203 to map the WIFI™ identification information to the in-band/WWAN of the femto access point 106. After identifying the femto access point 106 using the information obtained based on detection over the OOB link 206, UE 112 transmits a proximity indication to macro access point 105. The handover evaluation process will then continue as before.

The above-described method is applicable for femto access points that have OOB link capabilities. For femto access points without OOB link capabilities, the proximity indication reporting will continue to be triggered by the existing femto access point fingerprint mechanism. Thus, each UE determines when it has entered into a fingerprint area. When the target femto access point does not include an OOB radio or have OOB capabilities, proximity will be determined based on the UE's presence in the femto access point fingerprint area. However, if the femto access point is OOB capable, detection of the UE entering the femto access point fingerprint area triggers the UE to perform an OOB search for its femto access point.

Figure 3:
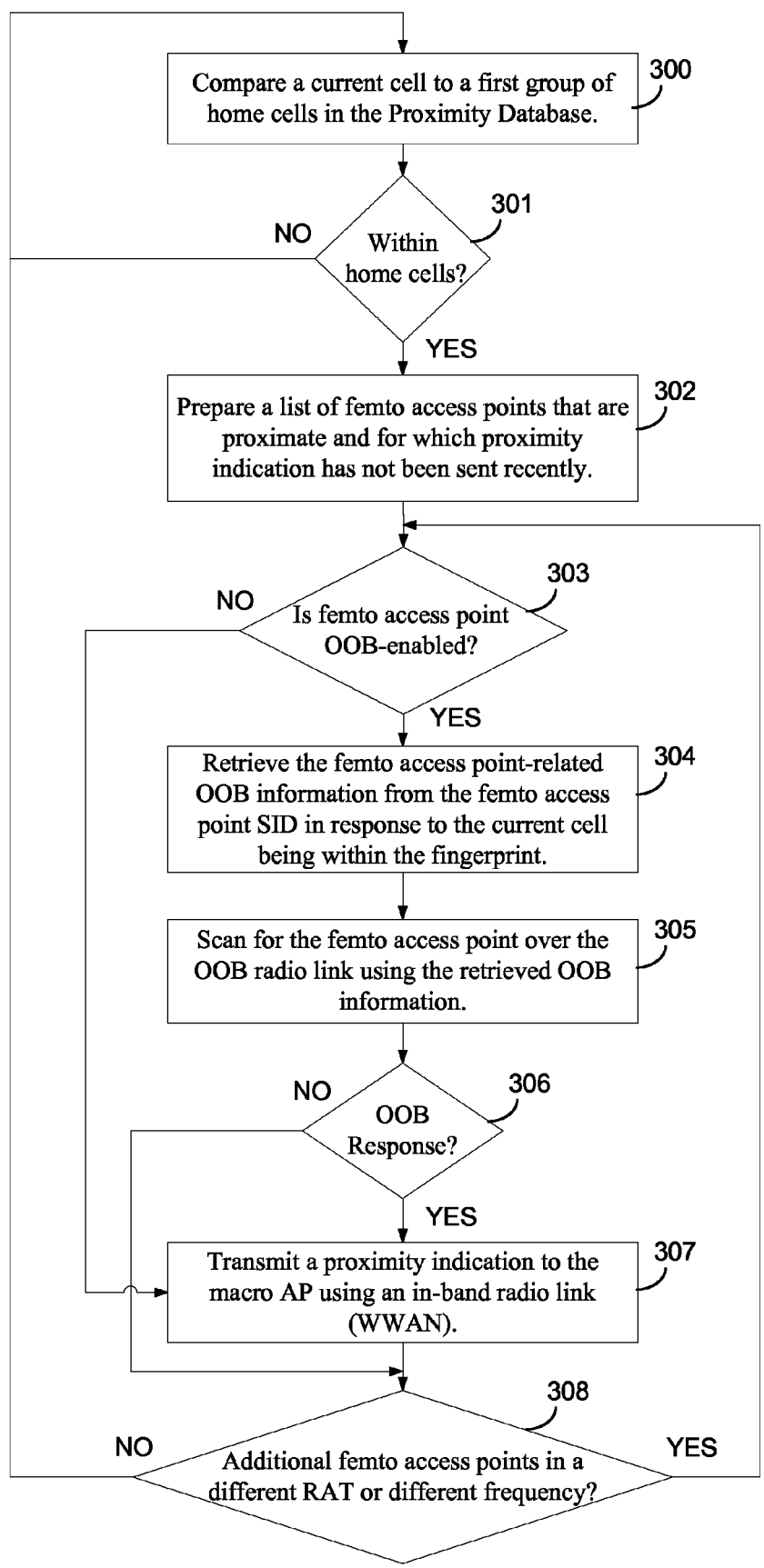
FIG. 3 is a functional block diagram illustrating example blocks executed to implement one aspect of the present disclosure.

FIG. 3 is a functional block diagram illustrating example blocks executed to implement one aspect of the present disclosure. In block 300, the UE compares a current cell location to a first group of home cells stored in a proximity database. The first group of home cells includes at least one neighbor cell of the femto access point associated with the UE. This first group of home cells corresponds to the fingerprint area around the femto access point associated with the UE. A determination is made, in block 301, whether the current cell location is included within the first group of home cells. If the current cell location does not fall within this first group of home cells, the UE continues monitoring and comparing a new current cell, in block 300, when a cell change is detected.

If the current cell location does fall into the first group of home cells, then, in block 302, the UE prepares a list of femto access points that are proximate to the UE and for which a proximity indication has not recently been sent. A determination is made, in block 303, whether the femto access point is enabled with an OOB radio. If so, then, in block 304, the UE retrieves femto access point-related OOB identification information stored in the femto access point SID. The UE then scans, in block 305, for the femto access point over the OOB radio link using the retrieved femto access point-related OOB identification information. A determination is made, in block 306, whether the UE has received a response from the femto access point over the OOB link. If so, then, in block 307, the UE transmits a proximity indication to the access point using the in-band or WWAN radio link.

It should be noted that, in response to the determination in block 303, if the femto access point is not enabled with an OOB radio, then, also in block 307, the proximity indication is transmitted.

A determination is then made, in block 308, whether there are any additional femto access points in a different radio access technology (RAT) or frequency. If so, then the UE continues the process by making the determination, in block 303, whether the additional femto access point is enabled with an OOB radio. If there are no more femto access points in different RATs or frequencies, then the UE will continue to monitor and compare new current cells, in block 300, to the first group of home cells stored in the proximity database.

It should be noted that if the UE does not receive a response over the OOB link in the determination made in block 306, then, the UE will make the determination, in block 308, whether there are any additional femto access points and continue at block 303 if there are additional femto access points or continue at block 300 if there are no additional femto access point.

Figure 4:
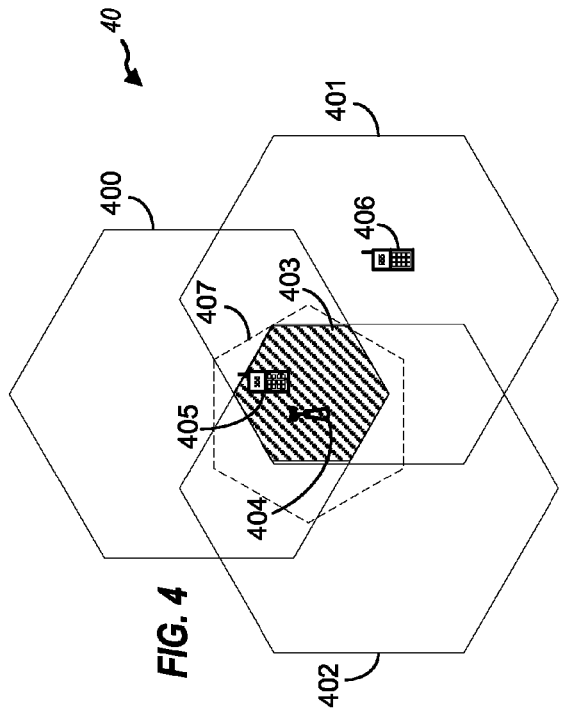
FIG. 4 is a block diagram illustrating a wireless communication network 40 configured according to one aspect of the present disclosure.

In a second alternative for OOB-enabled femto access points, the femto access point fingerprint mechanism may also trigger an enhanced fingerprint mechanism to run simultaneously with the OOB search. An enhanced fingerprint mechanism defines the fingerprint to be the intersection of each of the neighboring cells to the femto access point or an intersection of some neighboring cells to the femto access point, rather than the union, that defines the regular femto access point fingerprint. FIG. 4 is a block diagram illustrating a wireless communication network 40 configured according to one aspect of the present disclosure. The portion of wireless communication network 40 illustrated includes macro cells 400-402. The coverage areas of macro cells 400-402 define an intersection region 403. A femto access point 404 is located within intersection region 403. A UE 405 which identifies femto access point 404 may define its enhanced fingerprint area by the intersection region 403. When the UE 405 detects that it is within this intersection region 403, it may determine that it is in proximity to femto access point 404 and, thus, transmit a proximity indication to the serving base station. Because the intersection region 403 defines a smaller area around the femto access point 404, the UE 405 may more accurately determine when and if it is in proximity to its home node, femto access point 404.

In one aspect, when UE 405 enters the baseline fingerprint area, it does not transmit a proximity indication to the serving base station if the femto access point 404 is OOB-enabled. It scans for the femto access point 404 over the OOB link and also detects whether it is within the enhanced fingerprint area, intersection region 403. If UE 405 either detects femto access point 404 over the OOB link or detects it is within the enhanced fingerprint area of intersection region 403, the UE 405 will transmit a proximity indication to the serving base station for the femto access point 404 specifying femto access point 404's frequency and RAT.

It should be noted that the enhanced fingerprint area defined by the intersection region 403 may be a complex calculation or measurement to make. In one example process to determine the intersection region 403, the RF signature of the intersection region 403 may be measured and stored in the proximity database. The RF signature would record a detailed set of frequencies, signal strengths, and interference patterns created by the overlapping signals transmitted in macro cells 400-402. In another example process, the intersection region 403 may be defined by global positioning system (GPS) signals that define the boundaries of intersection region 403. The various aspects of the present disclosure may use multiple different methods for defining and measuring the intersection area 403.

In one aspect of the present disclosure, a proximity indication may be triggered by: (1) detection of the UE's presence within the fingerprint area if the femto access point is not OOB-enabled; (2) detection of the femto access point as a result of the OOB search triggered by the detected presence of the UE in the fingerprint area; or (3) detection of the UE's presence within the enhanced fingerprint area for an OOB-enabled femto access point.

Figure 5:
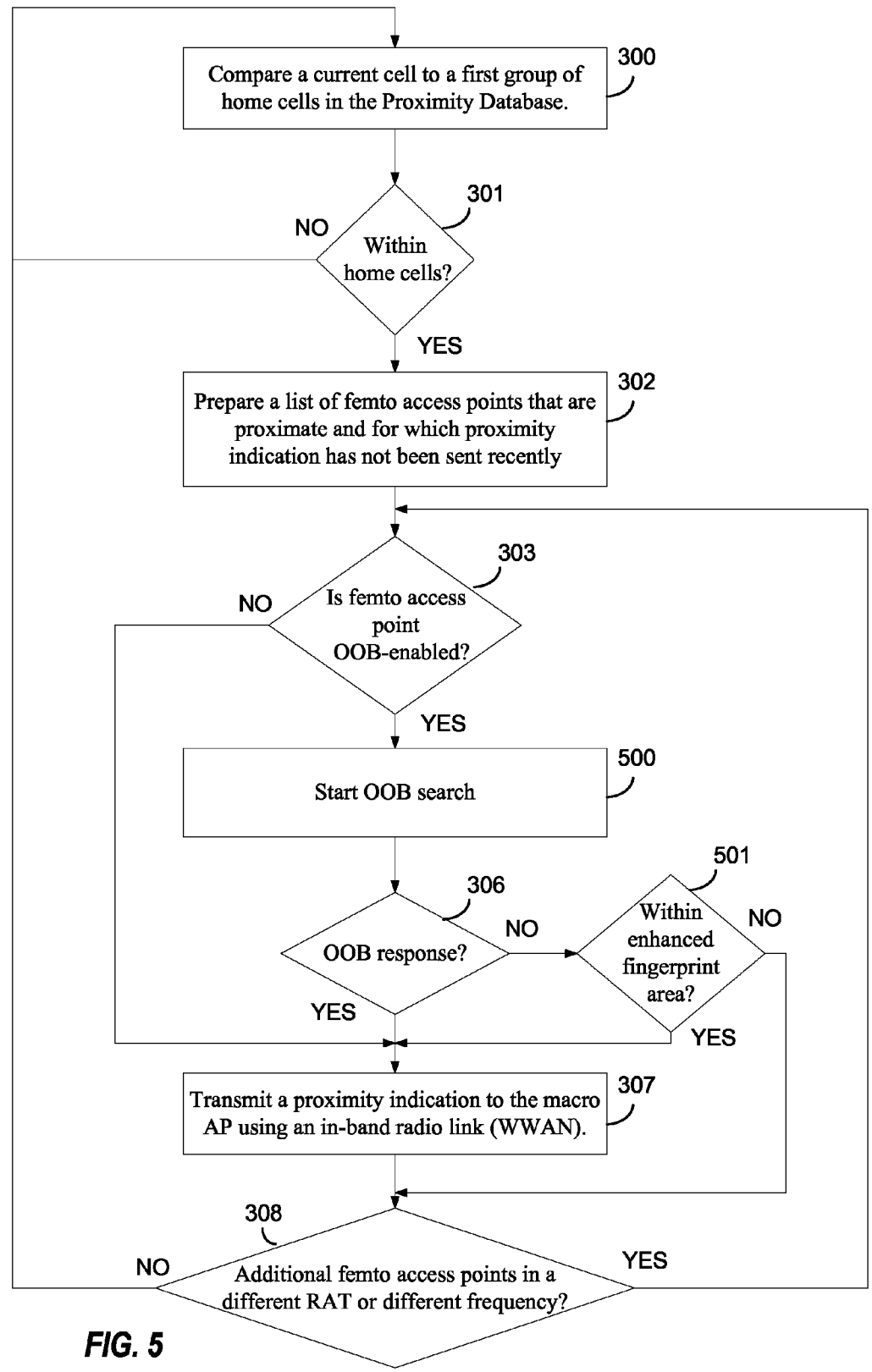
FIG. 5 is a functional block diagram illustrating example blocks executed to implement one aspect of the present disclosure.

FIG. 5 is a functional block diagram illustrating example blocks executed to implement one aspect of the present disclosure. The functionality illustrated in FIG. 5 begins in the same manner as the functionality illustrated in FIG. 3. In block 300, the UE compares a current cell location to a first group of home cells stored in a proximity database. A determination is made, in block 301, whether the current cell location is included within the first group of home cells. If the current cell location does not fall within this first group of home cells, the UE continues monitoring and comparing a new current cell, in block 300, when a cell change is detected.

If the current cell location does fall into the first group of home cells, then, in block 302, the UE prepares a list of femto access points that are proximate to the UE and for which a proximity indication has not recently been sent. A determination is made, in block 303, whether the femto access point is enabled with an OOB radio. If so, then, in block 500, the UE starts the search for the femto access point over an OOB link. The search, in block 500, may include the functionality described in blocks 304 and 305 of FIG. 3. Namely, retrieving femto access point-related OOB identification information stored in the femto access point SID in response to the current cell being within the fingerprint area and scanning for the femto access point over the OOB radio link using the retrieved femto access point-related OOB identification information. A determination is made, in block 306, whether the UE has received a response from the femto access point over the OOB link. If so, then, in block 307, the UE transmits a proximity indication to the serving base station using the in-band or WWAN radio link. The UE will also transmit the proximity indication, in block 307, when it is determined in response to the determination made in block 303, that the femto access point is not OOB-enabled.

If, in response to the determination in block 306, the UE determines that it has not received a response from the femto access point over the OOB link, then, in block 501, the UE makes a determination whether it is with an enhanced fingerprint area. The enhanced fingerprint area is defined by the intersection of the first group of home cells stored in the proximity database. The identification information that defines the enhanced fingerprint area is also stored in the proximity database. Therefore, the UE takes the appropriate measurements and compares those measurements to the information stored in the proximity database associated with the enhanced fingerprint area of the femto access point. If the UE is determined to be within the enhanced fingerprint area, then, in block 307, the UE transmits the proximity indication to the base station using the in-band/WWAN radio link.

After transmitting the proximity indication in block 307, or, if it is determined that the UE is not within an enhanced fingerprint area, in response to the determination made in block 501, then, in block 308, a determination is made by the UE whether there are any additional femto access points in different RATs or frequencies associated with the UE. If so, then, the UE re-starts the process by making a determination whether the femto access point is OOB-enabled, in block 303. If there are no further femto access points, then, the UE re-starts the process by monitoring and comparing new current cells, in block 300.

It should be noted that in additional aspects of the present disclosure, both conditions of receiving a response from the femto access point over the OOB radio link and finding the UE within the enhanced fingerprint area may be required before a proximity indication is transmitted to the macro network. As illustrated in FIG. 4, only UE 405 would transmit a proximity indication to its serving base station because it is the only illustrated UE that not only detects the femto access point 404 over the OOB link, but also determines its location to be within the enhanced fingerprint area of intersection region 403.

In an additional aspect of the present disclosure, when a femto access point does not have OOB transmission capabilities, the UE may transmit a proximity indication based on only the detected presence of the UE within the fingerprint area. For example, with reference to FIG. 4, in this example femto access point 404 does not have OOB transmission capabilities. UE 406 knows that femto access point 404 does not have OOB transmission capabilities. Therefore, when UE 406 detects its presence within its fingerprint area defined by the union of macro cells 400-402, it will not trigger any additional actions or searches, but instead trigger transmission of a proximity indication to its serving base station.

When a UE configured according to various aspects of the present disclosure detects the femto access point over the OOB link, the proximity indication is transmitted to the macro network. Thus, the initial detection of the femto access point over the OOB link is the entering condition for proximity in UEs configured according to various aspects of the present disclosure. Proximity of the UE to the femto access point continues as long as the UE continues to detect the femto access point over the OOB link. When the UE no longer detects the femto access point over the OOB link, the UE will no longer be considered proximate to the femto access point. Upon satisfying this leaving condition, the proximity indication will no longer be transmitted from the UE to the macro network. Table 1 illustrates the proximity conditions defined in the various aspects of the present disclosure.

TABLE 1

| OOB Femto Access Point | Entering Condition | Continuing Condition | Leaving Condition |
| --- | --- | --- | --- |
| Proximity Detection | UE detects femto access point over OOB link. | UE continues to detect femto access point over OOB link. | UE does not detect femto access point over OOB link. |

Updating Femto Access Point Search Information Database with Femto Access Point OOB Information When provisioned to make proximity indications for its femto access point, a UE will maintain a proximity database and a femto access point search information database (SID). In a typical WWAN scenario, the proximity database will include the fingerprint information for the UE's femto access points, while the femto access point SID will maintain femto access point in-band or WWAN identification information. When a femto access point is equipped with one or more OOB radios, (e.g., BLUETOOTH®, BLUETOOTH® LE, WIFI DIRECT™, ZIGBEE™, IEEE 802.11, IEEE 802.15, and the like), the femto access point SID will be updated to reflect the OOB identification information associated with the femto access point mapped to the corresponding WWAN identification information for the femto access point. For example, if the femto access point OOB radio is a WIFI™ radio, the OOB identification information will include the SSID (Service Set Identifier), channel of operation, etc. However, before updating the femto access point SID with the additional information about the femto access point's OOB identifiers, a problem arises in identifying the OOB information as belonging to the femto access point. One solution would be for network operators to require femto access points to broadcast or unicast all relevant OOB information over a WWAN link. However, this solution should be provisioned by the network operators. Therefore, until such network-controlled OOB information disclosure is implemented, other means for obtaining this OOB information is desired.

Figure 6:
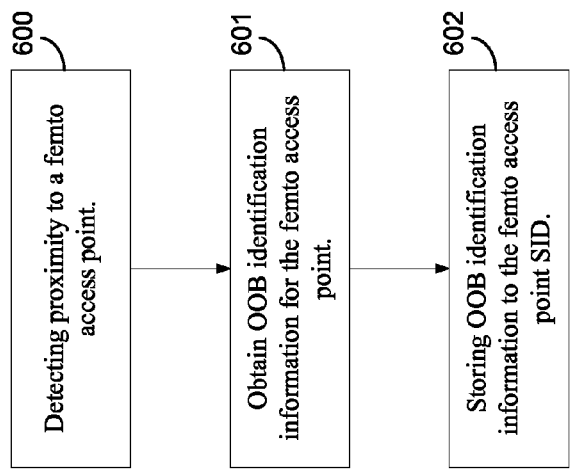
FIG. 6 is a functional block diagram illustrating example blocks executed to implement one aspect of the present disclosure.

FIG. 6 is a functional block diagram illustrating example blocks executed to implement one aspect of the present disclosure. In block 600, a UE detects a femto access point. The UE will detect the femto access point when it is able to confirm femto access point cell identity (in idle or active mode) by any of the following methods: manual CSG selection, cell reselection to/from member CSG/hybrid cell, handout/hand-in to a member CSG/hybrid cell, SID reading, or the like. Once the femto access point is discovered for the first time, the UE adds an entry to the femto access point SID for the corresponding femto access point. The UE will also add an entry in the proximity database related to the fingerprint area of the femto access point.

Once the femto access point is detected, then, in block 601, the UE obtains OOB identification information for the femto access point. The OOB identification information may comprise various different OOB attributes. For example, in a first aspect, the UE may store the SSID, in a WIFI™ OOB implementation or other such OOB identifier, such as the BD_ADDR identifier in a BLUETOOTH® OOB implementation, that the UE detects when in it discovers the femto access point. In such an example aspect, the associated femto access point may not even itself have OOB transmission capabilities. However, because surrounding entities have such capabilities, the UE may generate an OOB fingerprint of such surrounding OOB identifiers. Because the OOB transmission range is typically much less than that of WWAN transmissions from a macro access point, the OOB fingerprint would provide a smaller overall area for proximity determinations.

In a second aspect, the OOB identification information may be obtained, in block 601, from the SSID or other such OOB identifier, which are configured or coded to include femto access point-related information. In such example aspects, when the UE detects the SSID or other such OOB identifier, it can also obtain the OOB identification information about the femto access point.

In a third aspect, the OOB identification information may be obtained, in block 601, from an application running on the femto access point. The application maintains all of the femto access point-related information including its OOB identifiers in a specific format. The UE would access the application either over a femto access point WWAN or femto access point OOB link. If a femto access point WWAN link is used, the UE obtains the femto access point OOB identification information in much the same manner as accessing a printer or other service in the local network over WWAN using local internet protocol access (LIPA). Here, the UE can also obtain the femto access point OOB information without requiring to establish an OOB link to the femto access point. Alternatively, the UE can also obtain the femto access point OOB identification information from a femto access point over remote internet protocol access (RIPA) when it is outside the femto access point coverage, but still within macro coverage. In another alternative aspect, the handshaking may be performed over the OOB link (e.g. BLUETOOTH®, BLUETOOTH® LE, WIFI DIRECT™, ZIGBEE™, IEEE 802.15, and the like) instead of the WWAN link. Here, the femto access point information and femto access point WWAN identification information in particular are sent over the femto access point OOB link.

In a fourth aspect, the OOB identification information may be obtained, in block 601, from a femto access point that maintains two virtual access point identifiers. For example, such a femto access point would broadcast and maintain the two virtual access point identifiers with two separately broadcasted SSIDs or other such OOB identifiers from a single physical femto access point. The first SSID/OOB identifier and virtual access point may be used to advertise the femto access point OOB capability, such as, for example, by transmitting femto access point WWAN related information and enable application layer handshaking, while the other SSID/OOB identifier and virtual access point is used for actual traffic. In an alternative aspect, the first SSID/OOB identifier may be hidden, only allowing access by UEs that know to use the application layer handshaking.

In a fifth aspect, the femto access point identification information may be obtained, in block 601, through a new information element (IE) that may be defined in the particular OOB standards that operate to advertise the femto access point identification information.

In any of the various example aspects of obtaining the femto access point OOB identification information, once the information is obtained by the UE, it is stored, in block 602, to the UE's femto access point SID. The UE generates relational mapping information to be stored along with the femto access point OOB and in-band identities that will allow the UE to associate the femto access point OOB identification information with the other femto access point identification information including the in-band identification information.

Figure 7:
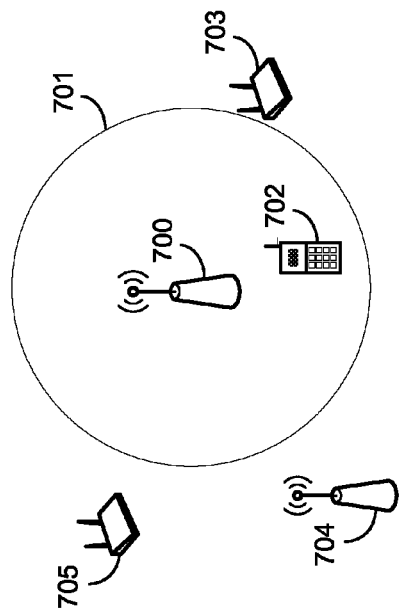
FIG. 7 is a block diagram illustrating a UE configured according to an aspect of the present disclosure where the femto access point itself does not have an OOB radio.

FIG. 7 is a block diagram illustrating a UE 702 configured according to an aspect of the present disclosure where the femto access point itself does not have an OOB radio. femto access point 700 is a femto access point for UE 702. However, UE 702 has not yet established a first connection with femto access point 700. In one example aspect illustrated by FIG. 7, UE 702 discovers femto access point 700 within femto access point coverage area 701 and establishes a connection therewith. UE 702 adds the identification of femto access point 700 to its femto access point SID, adds an entry in its proximity database with the neighbor cells around femto access point 700 (not shown), and also adds an entry to its CSG whitelist. While connected to femto access point 700, UE 702 detects OOB identifiers of access points, such as wireless routers 703 and 705 over OOB link by OOB scanning. The UE 702 creates an OOB fingerprint based on the OOB identifiers of wireless routers 703 and 705. The UE 702 updates the femto access point SID with this OOB fingerprint information corresponding to femto access point 700 entry. During subsequent times, the UE 702, while connected to a macro cell, determines that the cell or cells of its current location are part of the first group of home cells associated with the femto access point 700 by comparing its current location with the first group of home cells stored in its proximity database. Once this determination is made, the UE 702 retrieves the OOB identifiers stored in the femto access point SID and starts the OOB scan. When the UE 702 detects the OOB signals that represent or identify any of the OOB identifiers of the wireless routers 703 and 705, as stored in the femto access point SID, UE 702 determines that it is proximate to femto access point 700 and transmits proximity indication report to the macro cell (macro access point).

In another aspect of the example illustrated in FIG. 7, if the femto access point 700 is, in fact, equipped with an OOB radio, the OOB identification of the femto access point also could be included in the OOB fingerprint of femto access point 700 in femto access point SID along with the OOB identification information of wireless routers 703 and 705. Thus, as UE 702 detects the OOB identification of femto access point 700 or any other OOB identifiers in the OOB fingerprint, it determines that it is proximate to the femto access point 700 without establishing an OOB connection with femto access point 700.

In another example aspect illustrated by FIG. 7, UE 702 enters the femto access point coverage area 701 of femto access point 700, detects femto access point 700, and updates the proximity database, femto access point SID, and CSG whitelist. While performing an OOB scan over the OOB link, the UE 702 receives an OOB identifier of femto access point 700 over the OOB link. The OOB identifier may be an SSID in a WIFI™ system, a BLUETOOTH® device address (BD_ADDR) in a BLUETOOTH® system, or the like. For example, in a WIFI™ system, the SSID is defined to have up to a maximum length of 32 characters. The SSID broadcast by femto access point 700 is coded to convey femto access point in-band information. Thus, as UE 702 receives the SSID from femto access point 700, it may read the femto access point identification information, such as the femto access point WWAN identification information, from this SSID and store or update this information to the femto access point SID with regard to this femto access point 700. Using a 32-bit SSID, information, such as the operator, the femto cell ID, the operating frequency, the primary scrambling code (PSC), the radio access technology (RAT), and the CSG identifier, can be conveyed to the UE 702. Because this information is included in the SSID/OOB identifier of femto access point 700, the UE 702 can know this femto access point in-band and OOB identification information directly and may obtain this information without first establishing a connection with femto access point 700 over an OOB link. The UE 702 may then update the femto access point SID with the femto access point OOB information. During subsequent times, when UE 702, while connected to a macro cell, determines that the current cell or cells is part of the first group of home cells associated with the femto access point 700 as in the proximity database, it starts the OOB scan for the OOB identifier for femto access point 700 in femto access point SID. Once it detects the OOB identifier for femto access point 700, it determines that it is proximate to femto access point 700 and transmits proximity indication report to macro cell (macro access point).

In a third example aspect illustrated by FIG. 7, femto access point 700 may be configured to broadcast an information element (IE) over the OOB link that specifically includes the femto access point identification information such as the operator name, the femto cell ID, the operating frequency, the PSC, the RAT, and the CSG identifier. For example, the OOB protocol operated by femto access point 700 may be compliant with IEEE 802.11k. IEEE 802.11k is a standard for radio resource management in IEEE 802.11 wireless networks. It defines and exposes radio and network information to facilitate the management and maintenance of a Wireless LAN. This IE, that includes the femto access point identification, may be added to the IEEE 802.11k standard. Thus, as in the previous example aspect, as the UE 702 enters the femto access point coverage area 701, it detects the femto access point 700 and updates each of the proximity database, the femto access point SID, and the CSG whitelist. While doing the OOB scan over the OOB link, the UE 702 detects the femto access point OOB ID/SSID, and begins to receive the broadcast information from femto access point 700 including this femto access point IE. UE 702 reads the femto access point identification information from this IE and updates the femto access point SID with the femto access point OOB information corresponding to femto access point 700. During subsequent times, when UE 702, while connected to macro cell, determines that the cell or cells of its current location are part of the first group of home cells associated with the femto access point 700, as in the proximity database, it starts the OOB scan for the OOB identifier for femto access point 700, as found in the femto access point SID. Once the UE 702 detects the OOB identifier for femto access point 700, it determines that it is proximate to femto access point 700 and transmits proximity indication report to macro cell (macro access point).

Figure 8:
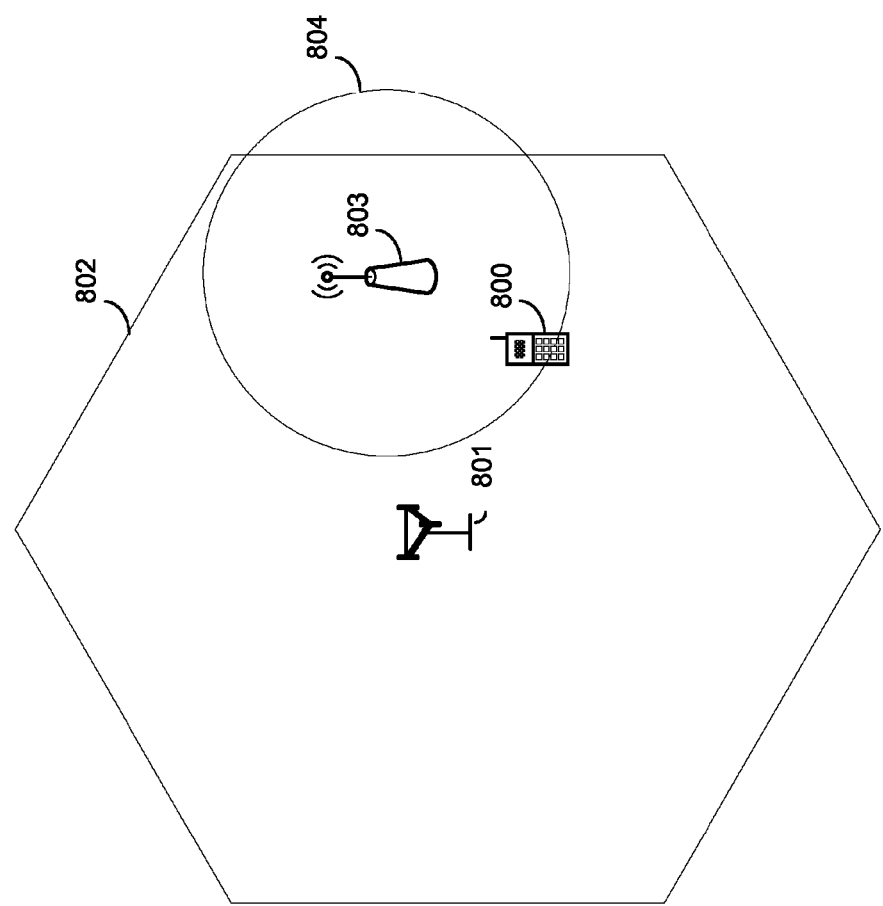
FIG. 8 is a block diagram illustrating a UE configured according to an aspect of the present disclosure.

In addition to receiving or determining femto access point OOB identification information from OOB identifiers or information elements, a UE may also obtain the mapping information between femto access point identification information and femto access point OOB identification information via application layer handshaking FIG. 8 is a block diagram illustrating a UE 800 configured according to an aspect of the present disclosure. A femto access point, such as femto access point 803, may be a networked device in a user's home or office network. UE 800 enters the femto access point coverage area 804 of femto access point 803 and detects femto access point 803. Upon detecting femto access point 803, UE 800 updates the proximity database, the femto access point SID, and the CSG whitelist. An application running on such a femto access point 803 or in the local network or on the internet may maintain the mappings between the femto access point identification information and femto access point OOB identification information. If the mapping is maintained in an application running on femto access point 803 or in the local network, an application running on UE 800 may access this application over its femto access point WWAN connection or over the macro access point 801. These are similar to accessing a locally networked device, such as a printer, over the femto access point WWAN connection using local internet protocol access (LIPA) protocols or over the macro WWAN connection using remote internet protocol access (RIPA), respectively. The application running on UE 800 accesses and performs handshaking with the application running on femto access point 803 or in the local network. Through this handshaking, the application running on UE 800 obtains the mapping between femto access point identification information and femto access point OOB identification information and updates the femto access point SID with the femto access point OOB information corresponding to femto access point 800. For example, when communicating via hypertext transfer protocol (HTTP), a predefined port may be used for communication of the femto access point identification information and femto access point OOB identification information by various means.

During subsequent times, when UE 800, while connected to macro cell, determines that the cell or cells of its current location are part of the first group of home cells associated with the femto access point 803, as maintained in the proximity database, it starts the OOB scan for the OOB identifier for femto access point 803 as in femto access point SID. Once it detects the OOB identifier for femto access point 803, the UE 800 determines that it is proximate to femto access point 803 and transmits proximity indication report to the macro cell 802 (macro access point 801).

In another example aspect illustrated by FIG. 8, instead of accessing an application running on the femto access point WWAN connection, UE 800 may access and perform handshaking with an application to obtain the mapping between femto access point identification information and femto access point OOB information over an OOB connection. femto access point 803 may be configured with one or more virtual access point identifiers, such as multiple associated OOB identifiers, which may each have their own different sets of security and network settings. One of these virtual OOB identifiers is used for UE 800 to connect to and perform application layer handshaking in order to obtain the mapping between femto access point identification information and femto access point OOB identification information while other virtual OOB identifiers are used for other communication. After obtaining this mapping, UE 800 updates the femto access point SID with the femto access point OOB information corresponding to femto access point 803.

During subsequent times, when UE 800, while connected to a macro cell, determines that the cell or cells of its current location are part of the first group of home cells associated with the femto access point 803, as maintained in the proximity database, it starts the OOB scan for the OOB identifier for femto access point 803, as in femto access point SID. Once it detects the OOB identifier for femto access point 803, the UE 800 determines that it is proximate to femto access point 803 and transmits proximity indication report to the macro cell 802 (macro access point 801).

It should be noted that in additional aspects of the disclosure, the virtual access point used for the femto access point OOB information, the OOB identifier for this virtual access point, for example its SSID, BD_ADDR, of the like, may be hidden. Thus, the OOB information associated with the femto access point 803 may only be accessible by UEs that are programmed to know to use the application layer handshaking through this hidden virtual access point.

Figure 9:
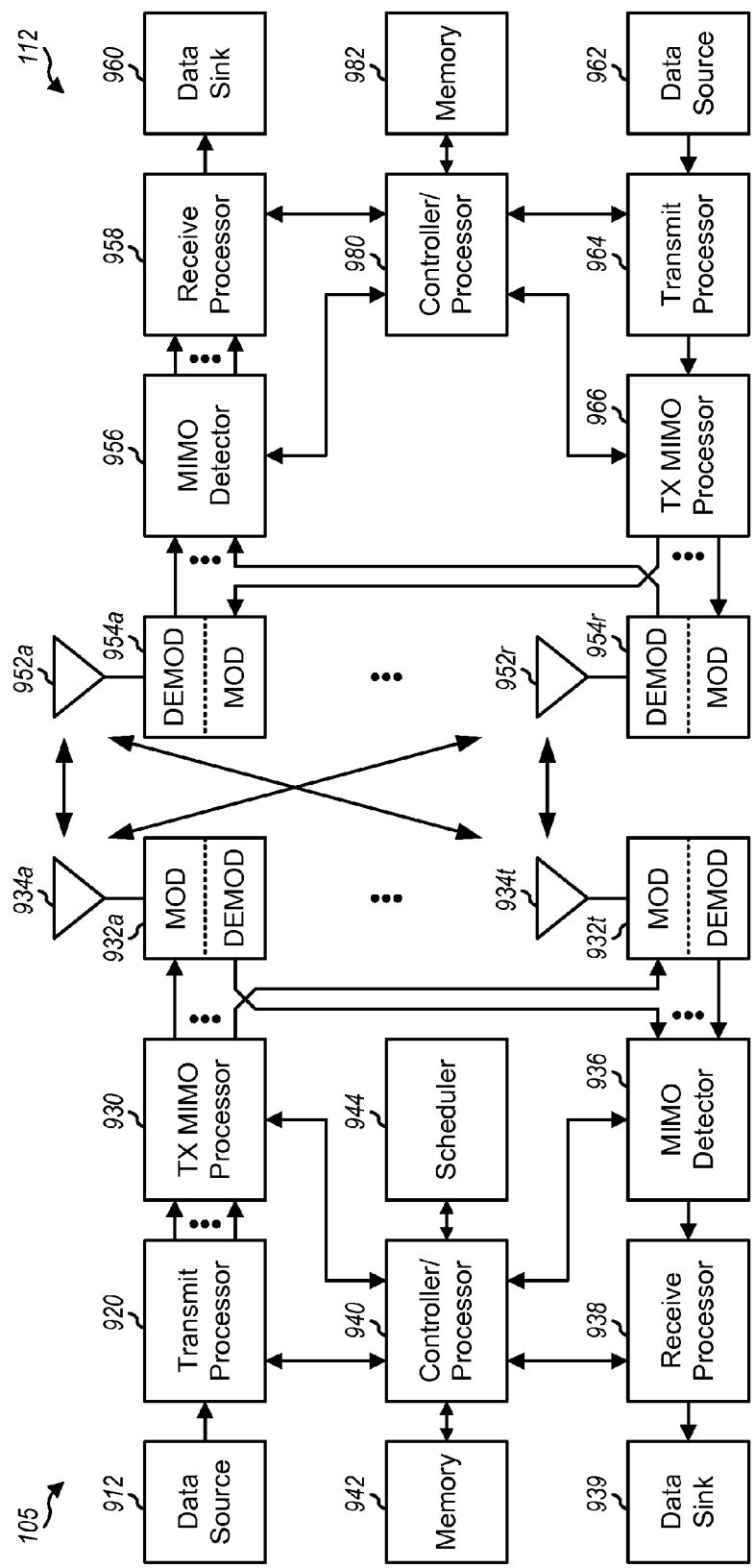
FIG. 9 shows a block diagram of a design of a base station/access point and a UE, which may be one of the base stations/access points and one of the UEs in FIG. 1.

FIG. 9 shows a block diagram of a design of a base station/access point 105 and a UE 112, which may be one of the base stations/access points and one of the UEs in FIG. 1. For a restricted association scenario, the access point 105 may be the macro access point 105 in FIG. 1, and the UE 112 may be the UE 112. The access point 105 may also be a base station of some other type. The access point 105 may be equipped with antennas 934a through 934t, and the UE 112 may be equipped with antennas 952a through 952r.

At the access point 105, a transmit processor 920 may receive data from a data source 912 and control information from a controller/processor 940. The control information may be for the PBCH, PCFICH, PHICH, PDCCH, etc. The data may be for the PDSCH, etc. The transmit processor 920 may process (e.g., encode and symbol map) the data and control information to obtain data symbols and control symbols, respectively. The transmit processor 920 may also generate reference symbols, e.g., for the PSS, SSS, and cell-specific reference signal. A transmit (TX) multiple-input multiple-output (MIMO) processor 930 may perform spatial processing (e.g., precoding) on the data symbols, the control symbols, and/or the reference symbols, if applicable, and may provide output symbol streams to the modulators (MODs) 932a through 932t. Each modulator 932 may process a respective output symbol stream (e.g., for OFDM, etc.) to obtain an output sample stream. Each modulator 932 may further process (e.g., convert to analog, amplify, filter, and upconvert) the output sample stream to obtain a downlink signal. Downlink signals from modulators 932a through 932t may be transmitted via the antennas 934a through 934t, respectively.

At the UE 112, the antennas 952a through 952r may receive the downlink signals from the access point 105 and may provide received signals to the demodulators (DEMODs) 954a through 954r, respectively. Each demodulator 954 may condition (e.g., filter, amplify, downconvert, and digitize) a respective received signal to obtain input samples. Each demodulator 954 may further process the input samples (e.g., for OFDM, etc.) to obtain received symbols. A MIMO detector 956 may obtain received symbols from all the demodulators 954a through 954r, perform MIMO detection on the received symbols if applicable, and provide detected symbols. A receive processor 958 may process (e.g., demodulate, deinterleave, and decode) the detected symbols, provide decoded data for the UE 112 to a data sink 960, and provide decoded control information to a controller/processor 980.

On the uplink, at the UE 112, a transmit processor 964 may receive and process data (e.g., for the PUSCH) from a data source 962 and control information (e.g., for the PUCCH) from the controller/processor 980. The transmit processor 964 may also generate reference symbols for a reference signal. The symbols from the transmit processor 964 may be precoded by a TX MIMO processor 966 if applicable, further processed by the demodulators 954a through 954r (e.g., for SC-FDM, etc.), and transmitted to the access point 105. At the access point 105, the uplink signals from the UE 112 may be received by the antennas 934, processed by the modulators 932, detected by a MIMO detector 936 if applicable, and further processed by a receive processor 938 to obtain decoded data and control information sent by the UE 112. The processor 938 may provide the decoded data to a data sink 939 and the decoded control information to the controller/processor 940.

The controllers/processors 940 and 980 may direct the operation at the access point 105 and the UE 112, respectively. The controller/processor 940 and/or other processors and modules at the access point 105 may perform or direct the execution of various processes for the techniques described herein. The controllers/processor 980 and/or other processors and modules at the UE 112 may also perform or direct the execution of the functional blocks illustrated in FIGS. 3, 5, and 6, and/or other processes for the techniques described herein. The memories 942 and 982 may store data and program codes for the access point 105 and the UE 112, respectively. A scheduler 944 may schedule UEs for data transmission on the downlink and/or uplink.

Figure 10:
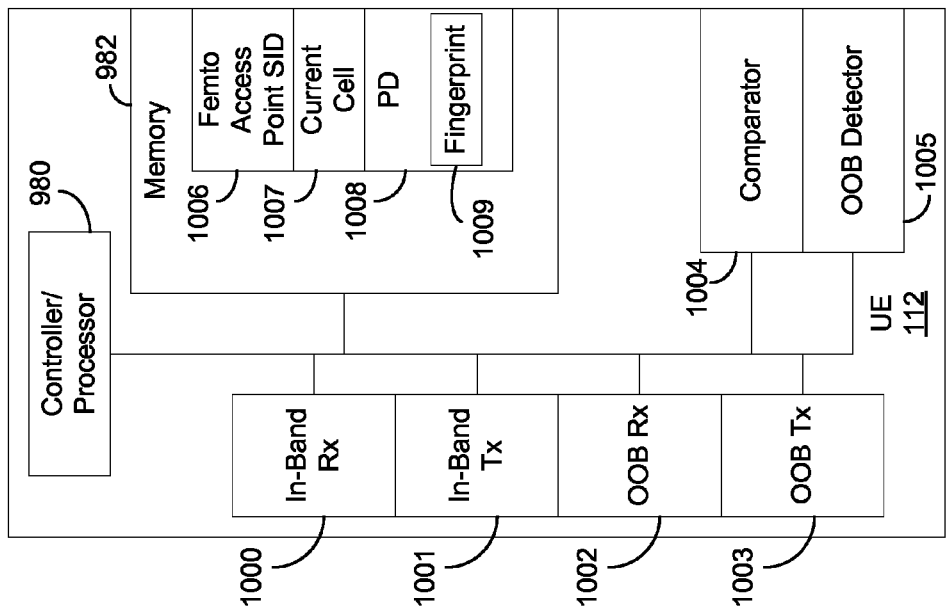
FIG. 10 is a block diagram illustrating a detail of a UE configured according to one aspect of the present disclosure.

FIG. 10 is a block diagram illustrating a detail of a UE 112 configured according to one aspect of the present disclosure. UE 112 includes a controller/processor 980 and a memory 982 coupled to the controller/processor 980. Memory 982 provides computer-readable storage of code and electronic information, which, when executed and used by controller/processor, controls and executes the code instructions that provide the various features and functionality of UE 112. Under control of controller/processor 980, in-band receiver 1000, in-band transmitter 1001, OOB receiver 1002, and OOB transmitter 1003, provide communication of data and control signals and information over in-band transmission frequencies and OOB transmission frequencies and protocols, such as BLUETOOTH®, WIFI™, and the like.

In receiving data and control signals over in-band receiver 1000, controller/processor 980 determines the current cell or cells of UE 112's current location, these components provide means for determining one or more cells of a current location. In various example aspects, the in-band receiver 1000 may include such components illustrated in FIG. 9 as antennas 952a-r, demodulators 954a-r, MIMO detector 956, and receive processor 958. The controller/processor 980 stores the current cell location 1007 of the UE 112 in memory 982. The controller/processor 980 accesses the current cell location 1007 and fingerprint area 1009 within the proximity database 1008 stored in memory 982 and controls comparator 1004 to compare the two pieces of location information. This combination of components provides means for comparing the current cells 1007 to the fingerprint area 1009 of the femto access point in proximity database 1008. This combination of components may also provide means for detecting a proximity of the UE 112 within a set of neighboring cells around the femto access point. The fingerprint area 1008 is determined by the UE 112 as the group of home cells that is neighboring one of the femto access points of UE 112. The UE 112 calculates or measures this information and stores it in memory 982.

In response to the results from the comparator 1004, the controller/processor 980 triggers scanning for the femto access point using the OOB receiver 1002, OOB transmitter 1003, and OOB detector 1005. The combination of these components provides means for scanning for femto access point using an OOB radio link using the femto access point OOB identifiers stored in the femto access point SID 1006 in memory 982. The UE 112 scans using the femto access point OOB identifiers from the femto access point SID 1006 and determines whether UE 112 detects the femto access point over the OOB radio link. When detected, the OOB receiver 1002 receives signals transmitted from the femto access point. The combination of these components provides means for determining detection of the femto access point over the OOB radio link.

Under control of controller/processor 980, the UE 112 maps the femto access point OOB identifiers to the femto access point identification information in the femto access point SID 1006 that was previously stored in memory 982. This combination of components provides means for mapping the femto access point OOB identifier to the femto access point identification information previously stored in the femto access point SID 1006. With the discovered femto access point, the controller/processor 980 triggers a proximity indication to be transmitted to the serving base station by in-band transmitter 1001. The combination of these components provides means for transmitting a proximity indication to a serving base station using an in-band radio link. In various example aspects, the in-band transmitter 1001 may include such components illustrated in FIG. 9 as transmit processor 964, TX MIMO processor 966, modulators 954*a*-4, and antennas 952*a*-*r*.

Prior to searching for a femto access point using an OOB radio link, the UE 112 first would obtain the OOB identification information regarding the femto access point. Once the UE 112 first detects the femto access point, in-band receiver 1000, under control of controller/processor 980 may receive macro cell information about the neighboring cells surrounding the femto access point. The UE 112 would store this information as the fingerprint 1009 stored in proximity database 1008 in memory 982. The combination of these components provides means for storing neighbor cell information for the femto access point in a proximity database 108 on the UE 112. When UE 112 detects the femto access point it may also obtain femto access point in-band identification information. The UE would store this in-band information in the femto access point SID 1006 in memory 982. The combination of these components provides means for storing femto access point identification information in the femto access point SID 1006 on the UE 112.

The UE 112 may also obtain OOB identification information when detecting the femto access point. This OOB identification information may come directly from the femto access point or it may be obtained from OOB-enabled devices neighboring the femto access point. The OOB detector 1005, under control of the controller/processor 982 would determine the relationship of the OOB identification information with the femto access point. The combination of these components provides means for determining femto access point OOB identification information related to the femto access point. The UE 112 would then update the femto access point SID 1006 with this femto access point OOB identification information. The combination of these components provides means for updating the femto access point SID with the femto access point OOB identification information related to the femto access point.

Once the UE 112 obtains the OOB identification information related to the femto access point, this information is stored by controller/processor 980 in the femto access point SID 1006 in memory 982. These components provide means for storing the OOB identification in the femto access point SID 1006.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 3, 5, and 6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both non-transitory computer storage media and communication media including any medium that facilitates transfer of a computer program from one place to another. A storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for detecting proximity to a femto access point, comprising:
   determining one or more current cells of a current location;
   comparing the one or more current cells to a first group of home cells associated with the femto access point, the first group of home cells comprising at least one neighbor macro cell of the femto access point; and
   scanning for the femto access point over an out-of-band (OOB) radio link using a femto access point OOB identifier stored in memory, wherein the scanning is triggered in response to the one or more current cells being part of the first group of home cells.

2. The method of claim 1, further comprising:
   determining detection of the femto access point over the OOB radio link;
   mapping the femto access point OOB identifier to femto access point identification information previously stored in memory, in response to determining detection of the femto access point over the OOB radio link; and
   transmitting a proximity indication to a serving base station using an in-band radio link, in response to determining detection of the femto access point over the OOB radio link.

3. The method of claim 2, further comprising:
   triggering a second comparison in response to the one or more current cells being part of the first group of home cells associated with the femto access point, the second comparison comprising:
   comparing the one or more current cells to an enhanced fingerprint, the enhanced fingerprint comprising:
      an area in which a portion of each coverage region of a plurality of cells neighboring the femto access point overlaps.

4. The method of claim 3, wherein, when the femto access point has no OOB radio, triggering the transmitting of the proximity indication in response to the one or more current cells being part of the enhanced fingerprint.

5. The method of claim 3, wherein the femto access point has at least one OOB radio wherein the transmitting comprises:
   transmitting the proximity indication in response to the one or more current cells being part of the enhanced fingerprint, in response to determining the femto access point is not detected over the OOB radio link.

6. The method of claim 2, wherein a communication frequency with the serving base station is different than the communication frequency for communication with the femto access point for a same radio access technology.

7. The method of claim 1, wherein the UE is in one of: an in-band connected mode or an in-band idle mode.

8. The method of claim 2, wherein the UE remains proximate to the femto access point in response to continued detection of the femto access point over the OOB radio link.

9. The method of claim 8, wherein the UE exits proximity to the femto access point in response to determining the femto access point is not detected over the OOB radio link.

10. The method of claim 2, wherein the UE remains proximate to the femto access point in response to:
    continued determining the one or more current cells are within the enhanced fingerprint; or
    continued detection of the femto access point over the OOB radio link.

11. The method of claim 10, wherein the UE exits proximity to the femto access point in response to:
    determining the one or more current cells are outside of the enhanced fingerprint; and
    determining that the femto access point is not detected over the OOB radio link.

12. The method of claim 1, wherein the OOB radio link comprises one of:
    BLUETOOTH®;
    BLUETOOTH® Low Energy (LE);
    WIFI™;
    WIFI DIRECT™;
    ZIGBEE™; and
    IEEE 802.15.

13. A method of managing information for a femto access point, comprising:
    detecting the femto access point by a user equipment (UE);
    storing neighbor cell information for the femto access point in a proximity database on the UE, including storing macro cell information about neighboring cells surrounding the femto access point;
    storing femto access point identification information in a femto access point search information database (SID) on the UE;
    determining femto access point out-of-band (OOB) identification information related to the femto access point; and
    updating the femto access point SID with the femto access point OOB identification information related to the femto access point.

14. The method of claim 13, further comprising:
    subsequently detecting the femto access point over an OOB radio of the UE;

obtaining, by the UE, the femto access point identification information by mapping the femto access point OOB identification information related to the femto access point to the femto access point identification information stored in the femto access point SID.

15. The method of claim 14, wherein the OOB radio comprises one of:
- a BLUETOOTH® radio;
- a BLUETOOTH® Low Energy (LE) radio;
- a WIFI™ radio;
- a WIFI DIRECT™ radio;
- a ZIGBEE™ radio; and
- an IEEE 802.15 radio.

16. The method of claim 13, wherein determining the femto access point OOB identification information comprises:
- detecting at least one OOB identifier (ID) when the femto access point is detected, wherein the femto access point OOB identification information comprises the at least one detected OOB ID.

17. The method of claim 13, wherein the determining comprises:
- detecting at least one OOB ID when the proximity within the set of neighboring cells is detected;
- determining the OOB identification information stored in the OOB ID.

18. The method of claim 13, wherein the determining comprises:
- establishing a communication link with an application running on a home network associated with the femto access point;
- receiving the OOB information from the application over the communication link.

19. The method of claim 18, wherein the communication link is one of:
- an in-band communication link; and
- and OOB communication link.

20. The method of claim 13, wherein determining the femto access point OOB identification information comprises:
- establishing an OOB communication link with a first virtual access point identifier using a first detected OOB ID; and
- receiving the femto access point OOB information from an application running on the first virtual access point.

21. The method of claim 20, further comprising:
- initiating application layer handshaking with the first virtual access point prior to the establishing, wherein the first OOB ID is a hidden OOB ID.

22. The method of claim 13, wherein determining the femto access point OOB identification information comprises:
- establishing an OOB communication link with an access point; and
- receiving an information element (IE) containing the femto access point identification information and the femto access point OOB identification information.

23. An apparatus configured to detecting proximity to a femto access point, comprising:
- means for determining one or more current cells of a current location;
- means for comparing the one or more current cells to a first group of home cells associated with the femto access point, the first group of home cells comprising at least one neighbor macro cell of the femto access point; and
- means for scanning for the femto access point over an out-of-band (OOB) radio link using a femto access point OOB identifier stored in memory, wherein the means for scanning is triggered in response to the one or more current cells being part of the first group of home cells.

24. The apparatus of claim 23, further comprising:
- means for determining detection of the femto access point over the OOB radio link;
- means for mapping the femto access point OOB identifier to femto access point identification information previously stored in memory, in response to determining detection of the femto access point over the OOB radio link; and
- means for transmitting a proximity indication to a serving base station using an in-band radio link, in response to determining detection of the femto access point over the OOB radio link.

25. The apparatus of claim 24, further comprising:
- means for triggering a second comparison in response to the one or more current cells being part of the first group of home cells associated with the femto access point, the second comparison comprising:
  - means for comparing the one or more current cells to an enhanced fingerprint, the enhanced fingerprint comprising:
    - an area in which a portion of each coverage region of a plurality of cells neighboring the femto access point overlaps.

26. The apparatus of claim 25, wherein, when the femto access point has no OOB radio, triggering the means for transmitting of the proximity indication in response to the one or more current cells being part of the enhanced fingerprint.

27. The apparatus of claim 24, wherein the femto access point has at least one OOB radio wherein the means for transmitting comprises:
- means for transmitting the proximity indication in response to the one or more current cells being part of the enhanced fingerprint, in response to determining the femto access point is not detected over the OOB radio link.

28. The apparatus of claim 24, wherein a communication frequency with the serving base station is different than the communication frequency for communication with the femto access point for a same radio access technology.

29. The apparatus of claim 23, wherein the UE is in one of: an in-band connected mode or an in-band idle mode.

30. The apparatus of claim 24, wherein the UE remains proximate to the femto access point in response to continued detection of the femto access point over the OOB radio link.

31. The apparatus of claim 30, wherein the UE exits proximity to the femto access point in response to determining the femto access point is not detected over the OOB radio link.

32. The apparatus of claim 25, wherein the UE remains proximate to the femto access point in response to:
- continued determining the one or more current cells are within the enhanced fingerprint; or
- continued detection of the femto access point over the OOB radio link.

33. The apparatus of claim 32, wherein the UE exits proximity to the femto access point in response to:
- determining the one or more current cells are outside of the enhanced fingerprint; and
- determining that the femto access point is not detected over the OOB radio link.

34. The apparatus of claim 23, wherein the OOB radio link comprises one of:
- BLUETOOTH®;
- BLUETOOTH® Low Energy (LE);
- WIFI™;

WIFI DIRECT™;
ZIGBEE™; and
IEEE 802.15.

35. An apparatus configured to managing information for a femto access point, comprising:
   means for detecting the femto access point by a user equipment (UE);
   means for storing neighbor cell information for the femto access point in a proximity database on the UE, including means for storing macro cell information about neighboring cells surrounding the femto access point;
   means for storing femto access point identification information in a femto access point search information database (SID) on the UE;
   means for determining femto access point out-of-band (OOB) identification information related to the femto access point; and
   means for updating the femto access point SID with the femto access point OOB identification information related to the femto access point.

36. The apparatus of claim 35, further comprising:
   means for subsequently detecting the femto access point over an OOB radio of the UE;
   means for obtaining, by the UE, the femto access point identification information by mapping the femto access point OOB identification information related to the femto access point to the femto access point identification information stored in the femto access point SID.

37. The apparatus of claim 36, wherein the OOB radio comprises one of:
   a BLUETOOTH® radio;
   a BLUETOOTH® Low Energy (LE) radio;
   a WIFI™ radio;
   a WIFI DIRECT™ radio;
   a ZIGBEE™ radio; and
   an IEEE 802.15 radio.

38. The apparatus of claim 35, wherein means for determining the femto access point OOB identification information comprises:
   means for detecting at least one OOB identifier (ID) when the femto access point is detected, wherein the femto access point OOB identification information comprises the at least one detected OOB ID.

39. The apparatus of claim 35, wherein the means for determining comprises:
   means for detecting at least one OOB ID when the proximity within the set of neighboring cells is detected;
   means for determining the OOB identification information stored in the OOB ID.

40. The apparatus of claim 35, wherein the means for determining comprises:
   means for establishing a communication link with an application running on a home network associated with the femto access point;
   means for receiving the OOB information from the application over the communication link.

41. The apparatus of claim 40, wherein the communication link is one of:
   an in-band communication link; and
   and OOB communication link.

42. The apparatus of claim 35, wherein means for determining the femto access point OOB identification information comprises:
   means for establishing an OOB communication link with a first virtual access point identifier using a first detected OOB ID; and
   means for receiving the femto access point OOB information from an application running on the first virtual access point.

43. The apparatus of claim 42, further comprising:
   means for initiating application layer handshaking with the first virtual access point prior to the establishing, wherein the first OOB ID is a hidden OOB ID.

44. The apparatus of claim 35, wherein means for determining the femto access point OOB identification information comprises:
   means for establishing an OOB communication link with an access point; and
   means for receiving an information element (IE) containing the femto access point identification information and the femto access point OOB identification information.

45. A computer program product to detect proximity to a femto access point in a wireless network, comprising:
   a non-transitory computer-readable medium having program code recorded thereon, the program code comprising:
      program code to determine one or more current cells of a current location;
      program code to compare the one or more current cells to a first group of home cells associated with the femto access point, the first group of home cells comprising at least one neighbor macro cell of the femto access point; and
      program code to scan for the femto access point over an out-of-band (OOB) radio link using a femto access point OOB identifier stored in memory, wherein the scanning is triggered in response to the one or more current cells being part of the first group of home cells.

46. The computer program product of claim 45, further comprising:
   program code to determine detection of the femto access point over the OOB radio link;
   program code to map the femto access point OOB identifier to femto access point identification information previously stored in memory, in response to determining detection of the femto access point over the OOB radio link; and
   program code to transmit a proximity indication to a serving base station using an in-band radio link, in response to determining detection of the femto access point over the OOB radio link.

47. The computer program product of claim 46, further comprising:
   program code to trigger a second comparison in response to the one or more current cells being part of the first group of home cells associated with the femto access point, the second comparison comprising:
      program code to compare the one or more current cells to an enhanced fingerprint, the enhanced fingerprint comprising:
         an area in which a portion of each coverage region of a plurality of cells neighboring the femto access point overlaps.

48. The computer program product of claim 47, further comprising, when the femto access point has no OOB radio, program code to trigger execution of the program code to transmit of the proximity indication in response to the one or more current cells being part of the enhanced fingerprint.

49. The computer program product of claim 47, wherein the femto access point has at least one OOB radio wherein the program code to transmit comprises:

program code to transmit the proximity indication in response to the one or more current cells being part of the enhanced fingerprint, in response to determining the femto access point is not detected over the OOB radio link.

50. The computer program product of claim 46, wherein a communication frequency with the serving base station is different than the communication frequency for communication with the femto access point for a same radio access technology.

51. The computer program product of claim 45, wherein the UE is in one of: an in-band connected mode or an in-band idle mode.

52. The computer program product of claim 46, wherein the UE remains proximate to the femto access point in response to continued detection of the femto access point over the OOB radio link.

53. The computer program product of claim 52, wherein the UE exits proximity to the femto access point in response to determining the femto access point is not detected over the OOB radio link.

54. The computer program product of claim 47, wherein the UE remains proximate to the femto access point in response to:
continued determining the one or more current cells are within the enhanced fingerprint; or
continued detection of the femto access point over the OOB radio link.

55. The computer program product of claim 54, wherein the UE exits proximity to the femto access point in response to:
determining the one or more current cells are outside of the enhanced fingerprint; and
determining that the femto access point is not detected over the OOB radio link.

56. The computer program product of claim 45, wherein the OOB radio link comprises one of:
BLUETOOTH®;
BLUETOOTH® Low Energy (LE);
WIFI™;
WIFI DIRECT™;
ZIGBEE™; and
IEEE 802.15.

57. A computer program product to manage information for a femto access point in a wireless network, comprising:
a non-transitory computer-readable medium having program code recorded thereon, the program code comprising:
program code to detect the femto access point by a user equipment (UE);
program code to store neighbor cell information for the femto access point in a proximity database on the UE, including program code to store macro cell information about neighboring cells surrounding the femto access point;
program code to store femto access point identification information in a femto access point search information database (SID) on the UE;
program code to determine femto access point out-of-band (OOB) identification information related to the femto access point; and
program code to update the femto access point SID with the femto access point OOB identification information related to the femto access point.

58. The computer program product of claim 57, further comprising:

program code to subsequently detect the femto access point over an OOB radio of the UE;
program code to obtain, by the UE, the femto access point identification information by mapping the femto access point OOB identification information related to the femto access point to the femto access point identification information stored in the femto access point SID.

59. The computer program product of claim 58, wherein the OOB radio comprises one of:
a BLUETOOTH® radio;
a BLUETOOTH® Low Energy (LE) radio;
a WIFI™ radio;
a WIFI DIRECT™ radio;
a ZIGBEE™ radio; and
an IEEE 802.15 radio.

60. The computer program product of claim 57, wherein the program code to determine the femto access point OOB identification information comprises:
program code to detect at least one OOB identifier (ID) when the femto access point is detected, wherein the femto access point OOB identification information comprises the at least one detected OOB ID.

61. The computer program product of claim 57, wherein the program code to determine comprises:
program code to detect at least one OOB ID when the proximity within the set of neighboring cells is detected;
program code to determine the OOB identification information stored in the OOB ID.

62. The computer program product of claim 57, wherein the program code to determine comprises:
program code to establish a communication link with an application running on a home network associated with the femto access point; and
program code to receive the OOB information from the application over the communication link.

63. The computer program product of claim 62, wherein the communication link is one of:
an in-band communication link; and
and OOB communication link.

64. The computer program product of claim 57, wherein the program code to determine the femto access point OOB identification information comprises:
program code to establish an OOB communication link with a first virtual access point identifier using a first detected OOB ID; and
program code to receive the femto access point OOB information from an application running on the first virtual access point.

65. The computer program product of claim 64, further comprising:
program code to initiate application layer handshaking with the first virtual access point prior to the establishing, wherein the first OOB ID is a hidden OOB ID.

66. The computer program product of claim 57, wherein program code to determine the femto access point OOB identification information comprises:
program code to establish an OOB communication link with an access point; and
program code to receive an information element (IE) containing the femto access point identification information and the femto access point OOB identification information.

67. An apparatus configured to detect proximity of a femto access point, the apparatus comprising:
at least one processor; and
a memory coupled to the at least one processor,
wherein the at least one processor is configured:

to determine one or more current cells of a current location;

to compare the one or more current cells to a first group of home cells associated with the femto access point, the first group of home cells comprising at least one neighbor macro cell of the femto access point; and to scan for the femto access point over an out-of-band (OOB) radio link using a femto access point OOB identifier stored in memory, wherein the scanning is triggered in response to the one or more current cells being part of the first group of home cells.

68. The apparatus of claim 67, wherein the at least one processor is further configured:

to determine detection of the femto access point over the OOB radio link;

to map the femto access point OOB identifier to femto access point identification information previously stored in memory, in response to determining detection of the femto access point over the OOB radio link; and to transmit a proximity indication to a serving base station using an in-band radio link, in response to determining detection of the femto access point over the OOB radio link.

69. The apparatus of claim 68, wherein the at least one processor is further configured:

to trigger a second comparison in response to the one or more current cells being part of the first group of home cells associated with the femto access point, the second comparison comprising configuration of the at least one processor:

to compare the one or more current cells to an enhanced fingerprint, the enhanced fingerprint comprising:

an area in which a portion of each coverage region of a plurality of cells neighboring the femto access point overlaps.

70. The apparatus of claim 69, further comprising, when the femto access point has no OOB radio, configuration of the at least one processor to trigger transmission of the proximity indication in response to the one or more current cells being part of the enhanced fingerprint.

71. The apparatus of claim 69, wherein the femto access point has at least one OOB radio, wherein the configuration of the at least one processor to transmit comprises configuration:

to transmit the proximity indication in response to the one or more current cells being part of the enhanced fingerprint, in response to determining the femto access point is not detected over the OOB radio link.

72. The apparatus of claim 68, wherein a communication frequency with the serving base station is different than the communication frequency for communication with the femto access point for a same radio access technology.

73. The apparatus of claim 67, wherein the UE is in one of: an in-band connected mode or an in-band idle mode.

74. The apparatus of claim 68, wherein the UE remains proximate to the femto access point in response to continued detection of the femto access point over the OOB radio link.

75. The apparatus of claim 74, wherein the UE exits proximity to the femto access point in response to determining the femto access point is not detected over the OOB radio link.

76. The apparatus of claim 69, wherein the UE remains proximate to the femto access point in response to:

continued determining the one or more current cells are within the enhanced fingerprint; or continued detection of the femto access point over the OOB radio link.

77. The apparatus of claim 76, wherein the UE exits proximity to the femto access point in response to:

determining the one or more current cells are outside of the enhanced fingerprint; and determining that the femto access point is not detected over the OOB radio link.

78. The apparatus of claim 67, wherein the OOB radio link comprises one of:

BLUETOOTH®;
BLUETOOTH® Low Energy (LE);
WIFI™;
WIFI DIRECT™;
ZIGBEE™; and
IEEE 802.15.

79. An apparatus configured to manage information for a femto access point, the apparatus comprising:

at least one processor; and a memory coupled to the at least one processor, wherein the at least one processor is configured:

to detect the femto access point by a user equipment (UE);

to store neighbor cell information for the femto access point in a proximity database on the UE, including storing macro cell information about neighboring cells surrounding the femto access point;

to store femto access point identification information in a femto access point search information database (SID) on the UE;

to determine femto access point out-of-band (OOB) identification information related to the femto access point; and to update the femto access point SID with the femto access point OOB identification information related to the femto access point.

80. The apparatus of claim 79, wherein the at least one processor is further configured:

to subsequently detect the femto access point over an OOB radio of the UE;

to obtain, by the UE, the femto access point identification information by mapping the femto access point OOB identification information related to the femto access point to the femto access point identification information stored in the femto access point SID.

81. The apparatus of claim 80, wherein the OOB radio comprises one of:

a BLUETOOTH® radio;
a BLUETOOTH® Low Energy (LE) radio;
a WIFI™ radio;
a WIFI DIRECT™ radio;
a ZIGBEE™ radio; and
an IEEE 802.15 radio.

82. The apparatus of claim 79, wherein the configuration of the at least one processor to determine the femto access point OOB identification information comprises configuration:

to detect at least one OOB identifier (ID) when the femto access point is detected, wherein the femto access point OOB identification information comprises the at least one detected OOB ID.

83. The apparatus of claim 79, wherein the configuration of the at least one processor to determine comprises configuration:

to detect at least one OOB ID when the proximity within the set of neighboring cells is detected;

to determine the OOB identification information stored in the OOB ID.

84. The apparatus of claim 79, wherein the configuration of the at least one processor to determine comprises configuration:

to establish a communication link with an application running on a home network associated with the femto access point; and to receive the OOB information from the application over the communication link.

85. The apparatus of claim 84, wherein the communication link is one of:

an in-band communication link; and and OOB communication link.

86. The apparatus of claim 79, wherein the configuration of the at least one processor to determine the femto access point OOB identification information comprises configuration:

to establish an OOB communication link with a first virtual access point identifier using a first detected OOB ID; and to receive the femto access point OOB information from an application running on the first virtual access point.

87. The apparatus of claim 86, wherein the at least one processor is further configured:

to initiate application layer handshaking with the first virtual access point prior to the establishing, wherein the first OOB ID is a hidden OOB ID.

88. The apparatus of claim 79, wherein the configuration of the at least one processor to determine the femto access point OOB identification information comprises configuration:

to establish an OOB communication link with an access point; and to receive an information element (IE) containing the femto access point identification information and the femto access point OOB identification information.

* * * * *